(12) United States Patent
Milli (10) Patent No.: US 6,275,048 B1
(45) Date of Patent: Aug. 14, 2001

(54) CAPACITIVE SENSOR ARRANGEMENT FOR A LIQUID OR GASEOUS MEDIUM, AND METHOD OF MAKING THE SAME

(75) Inventor: Walter Milli, Notzingen (DE)

(73) Assignee: DaimlerChrsyler AG, Stuttgart (DE)

( * ) Notice: Subject to any disclaimer, the term of this patent is extended or adjusted under 35 U.S.C. 154(b) by 0 days.

(21) Appl. No.: 09/431,475

(22) Filed: Nov. 1, 1999

(30) Foreign Application Priority Data

Oct. 31, 1998 (DE) .............................................. 198 50 245

(51) Int. Cl.⁷ ............................. G01N 27/22; G01R 27/26
(52) U.S. Cl. ........................... 324/690; 324/663; 324/686
(58) Field of Search .................................... 324/663, 686, 324/688, 690

(56) References Cited

U.S. PATENT DOCUMENTS

| 3,952,593 | 4/1976 | Ells . |
| 4,422,035 | * 12/1983 | RIsko .................................. 324/671 |
| 4,589,077 | 5/1986 | Pope . |
| 5,052,223 | 10/1991 | Regnault et al. . |
| 5,142,909 | 9/1992 | Baughman . |
| 5,406,193 | * 4/1995 | Sethi ................................... 324/71.1 |
| 5,412,327 | * 5/1995 | Meinen ............................... 324/686 |
| 5,437,184 | 8/1995 | Shillady . |

FOREIGN PATENT DOCUMENTS

| 69001151 | 3/1993 | (DE) . |
| 19644777 | 6/1998 | (DE) . |
| 0401111 | 12/1990 | (EP) . |
| 2752053 | 2/1998 | (FR) . |

\* cited by examiner

Primary Examiner—Glenn W. Brown
(74) Attorney, Agent, or Firm—W. F. Fasse; W. G. Fasse (57) ABSTRACT

A capacitive sensor for measuring characteristics of liquid or gaseous media has at least two outer carrier boards and a spacer plate that keeps the two outer boards at an exact dimensionally stable spacing from each other. A sensor capacitor is formed by a hollow space in the spacer plate flanked by two metal coatings forming capacitor plates on the inwardly facing surfaces of the outer boards. Two or more capacitors can be formed by stacking the desired number of boards and spacer plates. Ports are provided for the medium to flow into the hollow space or spaces preferably in the spacer plates. Further ports for pressure equalization inside and outside the sensor are formed either laterally in spacer plate margins or directly in the outer boards. A multitude of such sensors is manufactured simultaneously by printed circuit board techniques that provide the required capacitor plate forming coatings on the inwardly facing surfaces of the boards and the required conductor leads as well as metal screening against adverse field influences. The individual plates and boards are stacked, aligned and bonded and then cut along connector strips to form the individual sensors. Lead-through contacts are formed prior to the cutting.

18 Claims, 7 Drawing Sheets

CAPACITIVE SENSOR ARRANGEMENT FOR A LIQUID OR GASEOUS MEDIUM, AND METHOD OF MAKING THE SAME

PRIORITY CLAIM

This application is based on and claims the priority under 35 U.S.C. §119 of German Patent Application 198 50 245.1-52, filed on Oct. 31, 1998, the entire disclosure of which is incorporated herein by reference.

FIELD OF THE INVENTION

The invention relates to capacitive sensors for sensing a characteristic feature of a liquid or gaseous medium capable of entering into a hollow space in the sensor. A method for producing such capacitive sensors is also disclosed.

BACKGROUND INFORMATION

Sensors operating by using the sensing ability of a plate capacitor are known. The medium, a characteristic of which is to be sensed or measured, forms a dielectric between the plates of the plate capacitor. Such capacitive sensors are particularly suitable for sensing the filling level of a liquid such as oil in a container. Basically medium characteristics or parameters other than the filling level can also be derived from the dielectric characteristics of the medium. Tubular capacitors with cylindrical "plates" are also known for such sensing purposes. For example, German Patent Publication DE 196 44 777 C1 describes, in addition to the general prior art, a filling level sensor arrangement with a plurality of capacitive sensors which are electrically interconnected in several groups. The capacitive sensors forming the groups are arranged in stacks on one side of a carrier. The evaluation of the measured signals takes place in a quasi-digital mode for each group of capacitive sensors, whereby the effort and expense for the electrical wiring and for the evaluation circuit arrangement are increased.

European Patent Publication EP 0,401,111 B1, published in French, as translated in German Patent Publication DE 690 01 151 T2 discloses a capacitive sensor arrangement of the type to which the present invention relates. Two carrier plates carry metal capacitor coatings or claddings on plate surfaces facing each other. The carrier plates are interconnected by several rivets. Spacer rings are positioned on the rivet shafts between the plates. The rivets and the spacer rings are necessarily positioned outside the areas of the metal capacitor coatings or claddings. Further, the rivets and spacer rings must be electrically insulated from the metal capacitor coatings or cladding. These features of the known sensor increase its costs.

The carrier plates referred to hereafter as circuit boards or simply as boards are made of printed circuit board material and etching methods are used to structure the metal capacitor coatings or claddings and the required conductor leads. The boards carry as part thereof several coatings forming capacitor plates spaced from one another by the rings on the rivets and include for example a main electrode for sensing a filling level and a dielectric measuring electrode for measuring a possibly changing dielectric between the capacitor plates. A further metal coating may be provided to form an electric screen. These various coatings or cladding elements are individually connected by leads to respective connector areas on the boards. These connector areas and possibly further elements on the boards are connected to a separately arranged electronic measuring device or signal evaluating circuit not shown in any detail. The electric conductors required for connecting the sensor to a remote signal evaluating circuit are trouble prone and costly.

Besides, the measuring accuracy of the known sensor leaves room for improvement. In the known sensor the measuring accuracy depends much on the structural stability of the sensor namely on the number of rivets and the spacing of the rivets from each other. The rivets cannot assure in all instances that the boards will not bend or warp. Such warping is undesirable because it varies the spacing between the capacitor plates or rather metal coatings on the boards. A non-constant spacing varies the measuring accuracy.

OBJECTS OF THE INVENTION

In view of the foregoing it is the aim of the invention to achieve the following objects singly or in combination:

to avoid the above drawbacks of conventional capacitive sensors by assuring a constant, uniform spacing between the capacitor plates formed by the respective metal coatings on the carrier boards;

to substantially simplify the construction of such sensors while improving their measuring accuracy;

to properly screen capacitive sensors against external, adverse field influences;

to adapt the production techniques of multiboard printed circuit arrangements to the economic, simultaneous production of a multitude of capacitive sensors; and to improve the dimensional and structural stability of capacitive sensors made of printed circuit boards and spacer plates.

SUMMARY OF THE INVENTION

According to the invention it has been recognized that printed circuit techniques known for producing multiboard or multilevel printed circuit panels are adaptable to the production of capacitive sensors. According to the invention a spacer plate is inserted or sandwiched between two carrier boards to form a capacitor. The spacer plate is provided with a central opening forming a hollow space between the carrier boards. The hollow space is so positioned in the spacer plate that in the sensor the hollow space will be flanked on both sides by the capacitor plates formed by metal coatings on the two carrier boards. The spacer plate provides a margin area around the hollow space and this margin area keeps the carrier boards properly spaced with a constant spacing from each other even in the area of the hollow space. This spacing is exactly determined by the thickness of the spacer plate including its margin areas. Openings or ports are positioned to permit the fluid in the form of a liquid or gas to enter into the hollow space of the capacitive sensor. These openings include at least one first port at the bottom end of the sensor for entry of the fluid into the sensor and at least one pressure equalization second port above the bottom to permit pressure equalization between the hollow space inside the sensor and outside the sensor in the fluid container. The first and second ports may pass through the margin area of the intermediate spacer plate and/or directly through one or both of the outer carrier boards. Metallized lead-through contacts are provided for electrically interconnecting the carrier boards and the spacer plate. The just described sensor structure forms in its assembled state a multilevel printed circuit panel with hollow spaces. The medium to be measured enters into these hollow spaces through said first port. The margin area of the intermediate spacer plate provides a distinctly better dimensional stability for the present sensor compared to rivets with spacer rings on their shafts. As a result the present sensor achieves a better measuring accuracy.

Another advantage of the invention is seen in that the individual carrier boards can be electrically connected with each other through the intermediate spacer plate by metallized lead-through contacts. Such lead-through contacts may be formed by multi-board printed circuit techniques. Moreover, any electronic signal evaluation circuit for processing sensed signals can be integrated into the present sensors on an outer surface of an outer carrier board, whereby complicated trouble-prone electrical conductors and connections, for example by bonding wires, are avoided.

According to the method of the invention multitudes of the present sensors are produced simultaneously in an especially advantageous, particularly economic manner, by sandwiching a large sheet provided with a plurality of intermediate segmented spacer plates having hollow spaces in the spacer plates between two correspondingly large sheets comprising segmented carrier boards with metal coatings, whereby a sandwich panel is produced in which the segments form individual sensors which are interconnected by lands or strips. The individual boards and spacer plates forming a stack are adhesively bonded to one another to form the sandwich panels. The individual sensors are then cut out of the panel along the lands or strips. The cutting is preferably done after metallized lead-through contacts forming electrical connections have been formed in the panel. Prior to cutting the lands or strips also hold together margin areas, that form spacers between outer carrier boards, even where a flow opening or port interrupts the spacer margin areas. Several spacer sheets and several carrier board sheets may be stacked to form a multilayer sandwich or panel with spacer plates between neighboring carrier board sheets. The panels are then cut into a multitude of sensors.

It is an important advantage of the invention that experiences gained in production of multilevel printed circuit panels have been successfully adapted to the simultaneous and efficient production of a multitude of capacitive sensors. The sandwiching of the intermediate spacer plates or sheets having hollow spaces in register or alignment with the metal coatings of the outer carrier board sheets is achievable in a particular economic manner since conventional equipment for the manufacture of multilevel printed circuit panels can be used for the present purpose substantially without requiring for the equipment modifications worth mentioning. Thus, any separate and manual assembly operations are avoided.

BRIEF DESCRIPTION OF THE DRAWINGS

In order that the invention may be clearly understood it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

The Figs. show especially preferred example embodiments of capacitive sensors produced of preassembled sheets forming panels including three carrier boards 1, 3 and 5. The boards 1 and 5 form outer boards and the board 3 forms a centrally positioned board between the outer boards. The boards 1 and 3 are separated by a spacer plate 2. The boards 3 and 5 are separated by a spacer plate 4. Thus, the panel shown in FIG. 1 has five layers. More boards and spacer plates or fewer boards and spacer plates may be used. For example, two carrier boards spaced by one spacer plate provide a three layer panel for the present purposes.

Figure 1:
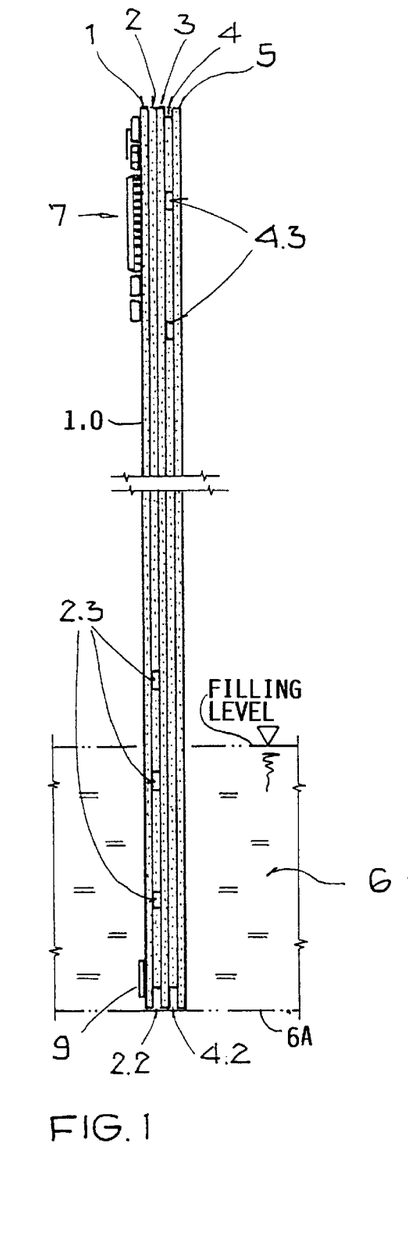
FIG. 1 is a side view of a capacitive sensor arrangement including two parallel capacitors for use in a gaseous or liquid medium.

FIG. 1 shows a side view of a capacitive sensor according to the invention inserted with its lower end into a medium 6 held in a container 6A. The carrier boards 1, 3 and 5 contact the bottom of the container. The spacer plates 2 and 4 are a little shorter than the carrier boards to provide first ports 2.2 and 4.2, respectively for the medium 6 to enter into the sensor, specifically into hollow spaces 2.1 and 4.1 provided inside the spacer plates 2 and 4 as shown particularly in FIGS. 3B and 3D. Second ports 2.3 and 4.3 are arranged laterally in margin areas or sections 2.4 and 4.4 of the spacer plates 2 and 4, respectively, for venting the hollow spaces to provide pressure equalization in the hollow space of the sensor and outside the sensor. The margin sections 2.4, 4.4 flank the hollow spaces 2.1 and 4.1 as best seen in FIGS. 3B and 3D or 4B, 4D. The laterally arranged outlet ports 2.3 and 4.3 also permit the medium to flow out of the hollow spaces 2.1 and 4.1 if the depth of the container 6A should require such outflow. Initially, when a container 6A is filled with the medium or the sensor is dipped into a container a liquid medium 6 flows into the hollow spaces through the bottom ports 2.2 and 4.2. A gaseous medium enters the hollow spaces through all ports. Pressure equalization between the medium inside the sensor and the medium outside the sensor is provided in all instances. As a result, the filling level inside the sensor corresponds to the filling level outside the sensor in the container 6A holding the medium 6 which permits measuring the filling level, for example.

The spacing between the carrier boards 1 and 3 is determined by the thickness of the spacer plate 2. Similarly, the spacing between the carrier boards 3 and 5 is determined by the thickness of the spacer plate 4. These spacings are preferably so selected that any capillary forces that may be effective in the hollow spaces 2.1 and 4.1 do not influence the accuracy of the measured filling level. Hence, capillary forces may be disregarded.

Figure 2:
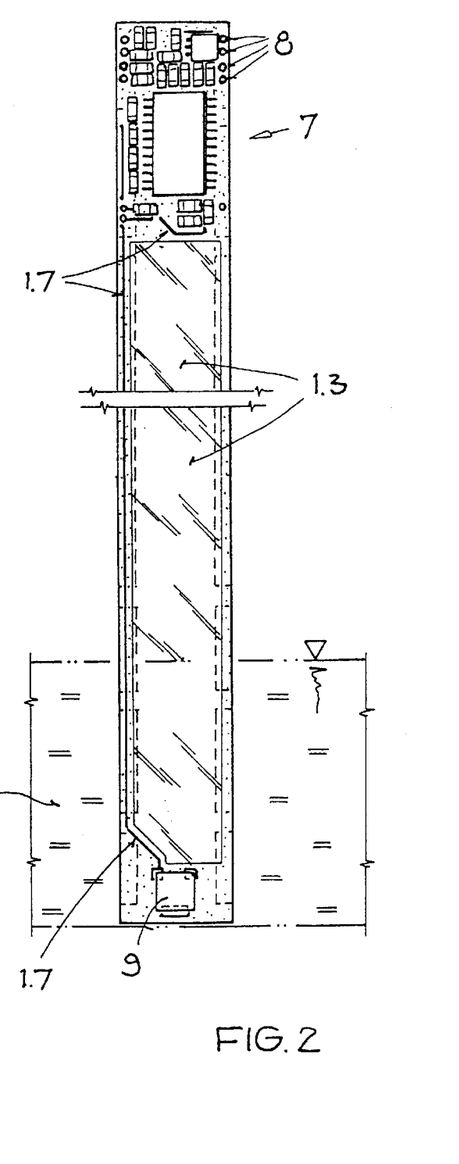
FIG. 2 is a front view of the sensor arrangement according to FIG. 1.

A measured signal evaluating circuit 7 is preferably provided on the outwardly facing front face 1.0 of the first carrier board 1. The individual components of the signal evaluating circuit 7 are shown schematically on the front face 1.0 as best seen in FIG. 2. A further sensor 9 is secured to the front face 1.0 at the lower end of the board 1, for example for measuring the temperature or the chemical composition or any outer characteristic of the medium 6 which may be a liquid or a gas present in the hollow spaces 2.1 and 4.1 thereby forming a dielectric between capacitor plates to be described in more detail below. The example embodiments shown herein are particularly useful as filling level sensors for example for sensing the level of engine oil in the oil pan of an internal combustion engine.

FIGS. 3A to 3E show the front faces 1.0, 2.0, 3.0, 4.0 and 5.0 of five individual elements forming the sensor, namely the carrier boards 1, 3 and 5 and the spacer plates 2 and 4. The carrier plates 1, 3 and 5 are electrically connected through the spacer plates 2 and 4 by metallized bores forming lead-through contacts 8. Certain of the lead-through contacts 8 permit the formation of a sensor circuit arrangement through printed circuit lead conductors 1.7, 3.4, 5.4 leading to the capacitor plates formed by metal coatings 3.1 and 5.1. Other lead-through contacts 8 connect respective conductor leads which are preferably grounded to metal coatings 1.3, 2.7, 3.2 forming electrical screens against adverse field influences. Still other lead-through contacts 8 are connected to circuit components 7 and 9 through respective conductor leads, as will be described in more detail below with reference to FIG. 6.

Figures 3A, 3B, 3C:
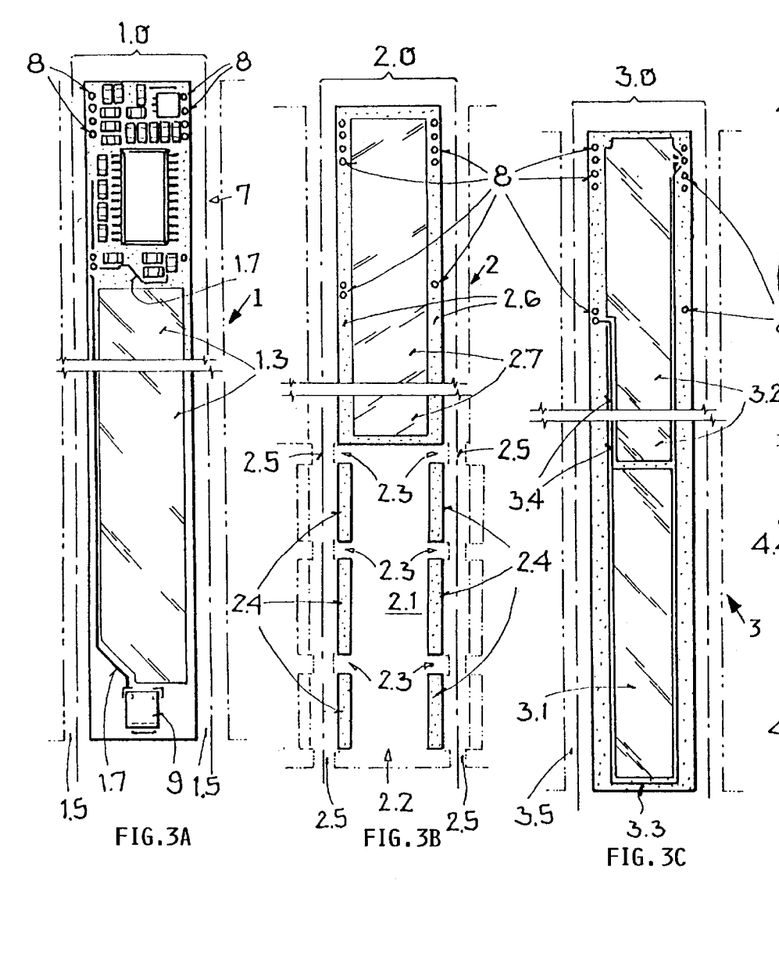
FIGS. 3A to 3E show in sequence an exploded view of the sensor arrangement of FIG. 1 illustrating the front face of the individual carrier boards and spacer plates.

The illustration of the front face 1.0 of the first outer carrier board 1 shown in FIG. 3A corresponds to the illustration of FIG. 2 showing the evaluating circuit 7 with the printed circuit conductor leads 1.7, the circuit components forming the evaluating circuit 7 and the further sensor 9. A metal coating 1.3 on the front face 1.0 forms an electric screening against adverse field influences, e.g. electromagnetic fields. The conductor leads 1.7 are connected to SMD (surface mounted device) contact points for the further sensor 9.

The front face 2.0 of the spacer plate 2 is shown in FIG. 3B next to the front face 1.0. In the mounted state the spacer plate 2 is positioned behind or below the outer board 1. The spacer plate 2 has an opening 2.1 in its lower half. The opening 2.1 is surrounded along the margins by individual margin sections or areas 2.4 spaced from each other by further openings forming the above-mentioned ports 2.3 for the medium 6. The port or ports 2.3 assure that pressure equalization takes place in the respective hollow space so that the sensor is filled by the medium 6 to the same level as the medium in the container 6A. The margin sections or areas 2.4 of the spacer plate 2 stabilize the entire sensor and form spacers between the outer carrier board 1 and the intermediate carrier board 3. Preferably, the margin sections or areas 2.4 forming spacers are larger in their area or length dimensions than the respective dimensions of the ports 2.3. The individual spacer margin sections 2.4 are initially interconnected with neighboring margin sections or areas on a sheet of spacer plate material by strips or lands 2.5 also seen in FIG. 5. These strips or lands 2.5 are severed when individual sensors are cut-out of a larger panel as will be described below. The surface area size of the central cut-out or hollow space 2.1 is adapted to the surface area size of the neighboring capacitor plates formed by metal coatings 1.1 of the first outer carrier board and the metal coating 3.1 of the central carrier board 3. The intermediate plate 2 is preferably provided in its upper area with a metal coating 2.7 forming an electrical screening. The laterally remaining margin sections 2.6 outside the metal coating 2.7 are generally not metallized in order to accept an adhesive for bonding the outer carrier boards 1 and 5 and the central carrier board 3 to the spacer plates 2 and 4 when a panel of five layers or sheets is formed by adhesive bonding. Individual sensors are then cut or severed from the panel.

Figures 4A, 4B, 4C:
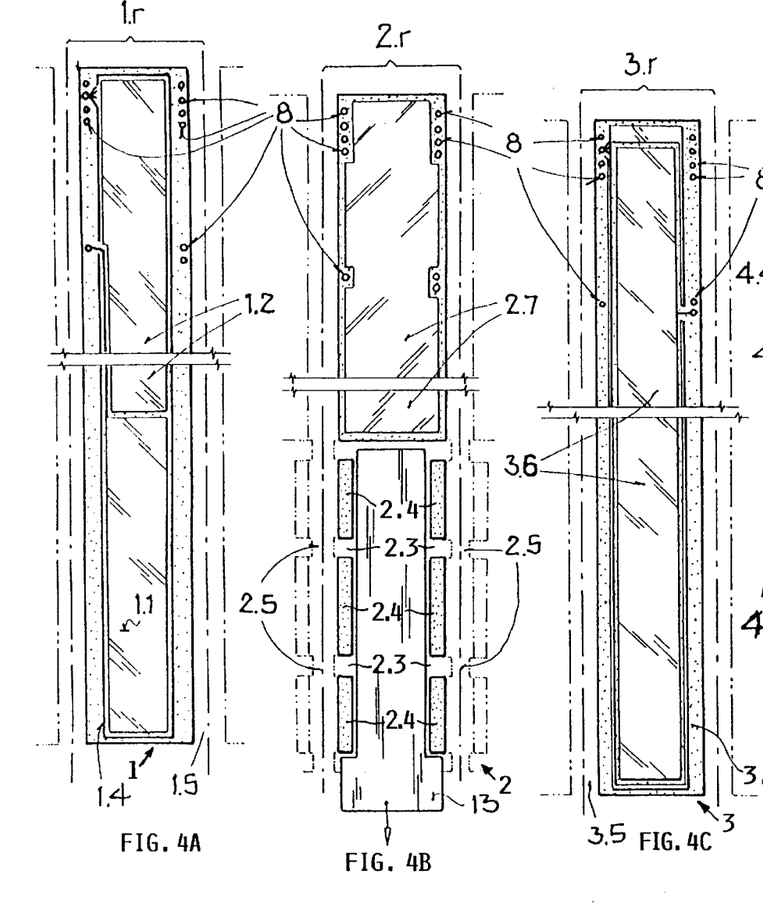
FIGS. 4A to 4E show in sequence an exploded view similar to that FIG. 3 but illustrating the back face of the individual carrier boards and spacer plates.
Figure 5:
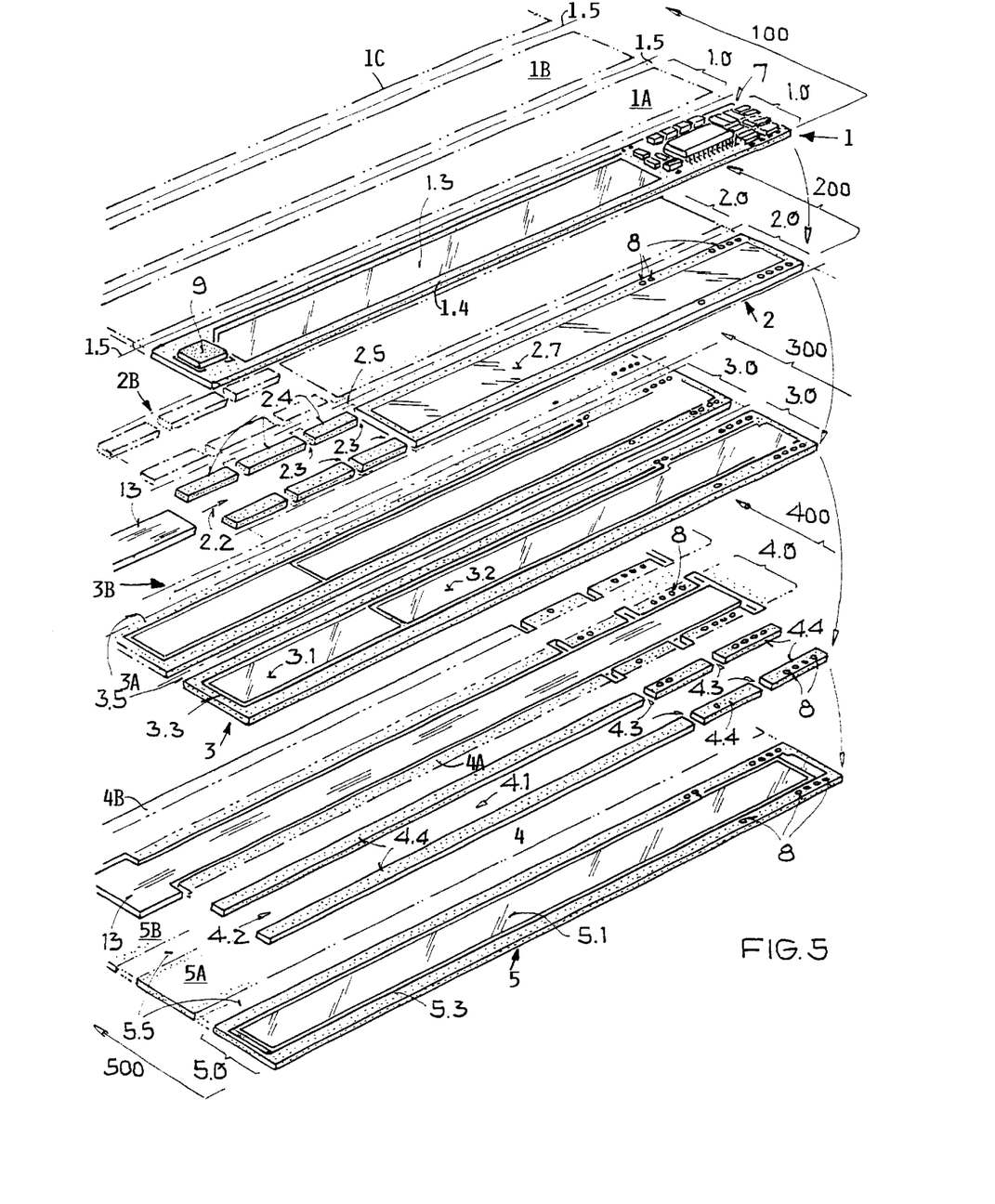
FIG. 5 illustrates in an exploded perspective view a sandwich panel showing a manufacturing sequence according to the invention for producing the present sensors including cutting individual sensor sections out of the sandwich panel, including intermediate spacer plates 2 and 4 and carrier boards 1, 3, 5.

As shown in FIGS. 3C, 4C and in FIG. 5, the next or third layer in the sandwich panel is formed by the second or central intermediate carrier board 3. The central carrier board 3 is laterally displaced in the perspective exploded view of FIG. 5 to illustrate the structure of the intermediate carrier board 3, including the metal coating 3.1 forming a respective capacitor plate. The metal coating 3.1 is surrounded by a metallic margin or rim 3.3 which is spaced and electrically insulated from the metal coating 3.1 all around, whereby the margin or rim 3.3 forms an electrical screening against adverse field influences. The metallic margin or rim 3.3 is interrupted to provide space for a printed circuit conductor lead 3.4 connecting the respective metal coating or capacitor plate 3.1 to a corresponding lead-through metallized contact 8 as seen for example in FIG. 3C. The upper portion of the front face 3.0 of the intermediate carrier board 3 is provided with a metal coating 3.2 forming an electrical screening against adverse influences. The metal coating 3.2 is connected to a ground or reference potential terminal.

Figures 3D, 3E:
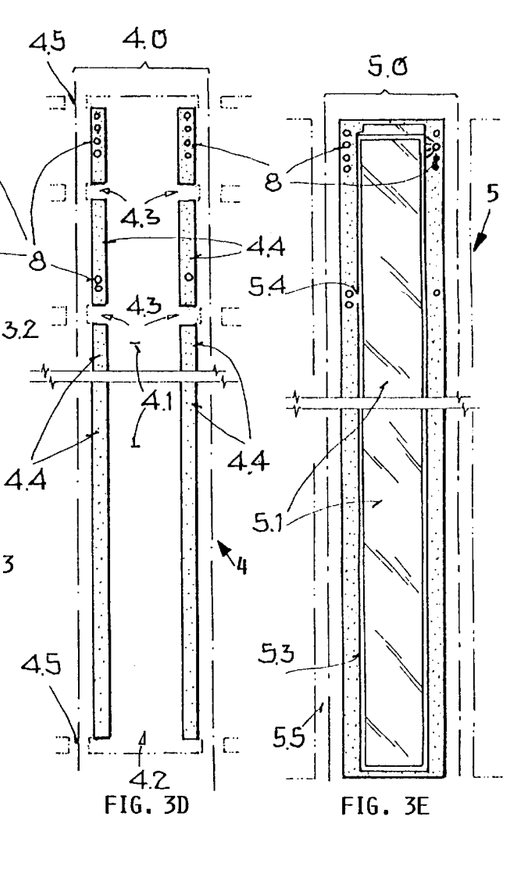
Figures 4D, 4E:
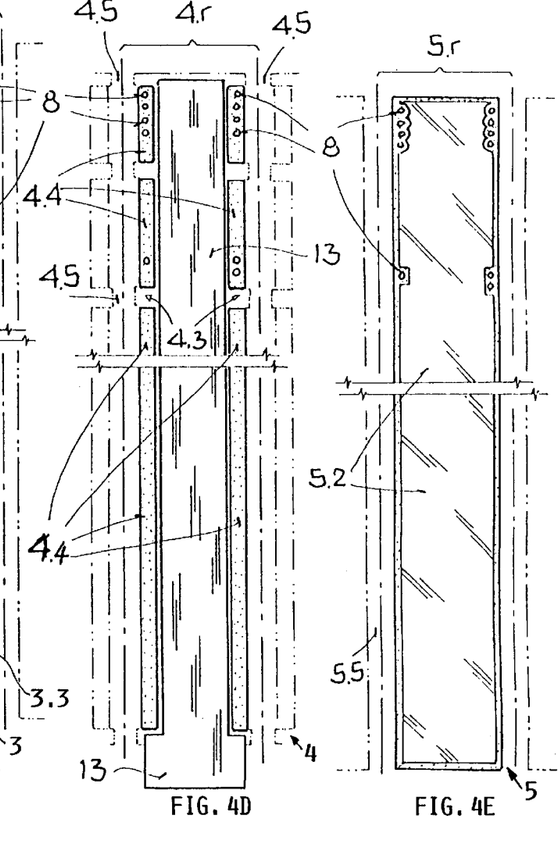

FIGS. 3D and 4D show the second spacer plate 4 embodied by two longitudinal spacer strips 4.4 which flank a recess forming a hollow space 4.1 having a first or bottom port 4.2 and at least one second port 4.3 passing through spacer strips 4.4. The upper sections of the spacer strips 4.4 are provided with metallized lead-through contacts 8 cooperating with respective contacts in the other portions of the sensor. The central hollow space 4.1 between the spacer strips 4.4 extends substantially along the entire length of the sensor. The spacer strips 4.4 maintain a dimensionally stable constant spacing between the intermediate carrier board 3 shown in FIG. 3C and the second outer board 5 shown in FIG. 3E, thereby also maintaining an exact dimensionally stable spacing between the capacitor plate 3.6 on the back face 3r of the intermediate carrier board 3 and the capacitor plate 5.1 on the inwardly facing surface 5.0 of the second outer carrier board 5. The capacitor plate or coating 3.6 is shown in FIG. 4C. Medium 6 can flow into the hollow space 4.1 through the bottom port 4.2 shown in FIG. 3D. However, medium may also flow out of the bottom ports 2.2, 4.2 when the sensor is lifted out of the container or liquid sinks in the container. The opening or openings 4.3 form pressure equalization inside and outside the sensor, whereby the medium level in the tank or oil pan and in the sensor will be the same to assure an accurate measurement.

FIGS. 3E and 4E show the outer carrier board 5 carrying on its inwardly facing surface 5.0 a metal coating forming a capacitor plate 5.1 flanked by a printed circuit conductor lead 5.4 connected to a respective metallized bore forming a lead-through contact 8. The capacitor plate 5.1 is surrounded by, but spaced or insulated from, a metallic margin strip 5.3 providing an electric screening against adverse field influences.

FIGS. 4A to 4E show the back sides or rear faces 1r, 2r, 3r, 4r, and 5r of the three board and two plate elements forming the sensor. The capacitor plate forming coating 1.1 on the back face 1r of the first carrier board 1 (FIG. 4A) is symmetrically arranged to the capacitor plate 3.1 on the front face 3.0 of the second central carrier board 3 (FIG. 3C) and substantially congruent thereto. The hollow space 2.1 between the two capacitor plates 3.1 and 1.1 is filled with the medium to be measured. For example, when a certain minimal filling level is to be maintained in a container or oil pan, the hollow space 2.1 is always completely filled with medium 6 forming the dielectric inside the capacitor as long as the minimum level is maintained. Thus, the relative dielectric constant of the medium 6 may be determined and provides a measure for the filling level. The intermediate spacer plates 2 and 4 have preferably identical front faces 2.0, 4.0 and rear faces 2r and 4r. The capacitor plate 1.1 is surrounded by, but insulated from, metal strips 1.4 forming electrical screens against adverse field influences. The free portions of the surfaces are covered with metal coatings 1.2 further enhancing the protective screening of the sensor against adverse field influences.

The back face 3r of the second intermediate board 3 is shown in FIG. 4C and carries a metal coating forming a capacitor plate 3.6 which corresponds in size to the metal coating on the outer board 5 forming a capacitor plate 5.1 on the front face 5.0 of the third board 5 (FIG. 3E). The capacitor plates 3.6 and 5.1 form a second capacitor which may, for example be used for measuring the filling level in a container. The relative dielectric constant measured with the help of the first capacitor can also be used in determining the filling level in a container.

FIGS. 4B and 4D illustrate temporary insert strips 13 made of a filler material which are inserted into the hollow spaces 2.1 and 4.1 of the spacer plates 2 and 4 prior to adhesively bonding the spacer plates 2 and 4 to the neighboring carrier boards 1 and 3 on the one hand and 3 and 5 on the other hand. These insert strips 13 make sure during the adhesive bonding that the applied pressure does not bend or dent the carrier boards 1, 3 and 5. After the adhesive bonding is completed the insert strips 13 are removed through the lower ports 2.2 and 4.2. The back face 5r of the second outer carrier board shown in FIG. 4E is an outwardly facing surface and carries a metal coating 5.2 to form an effective electrical screening against adverse field influences.

Figure 10:
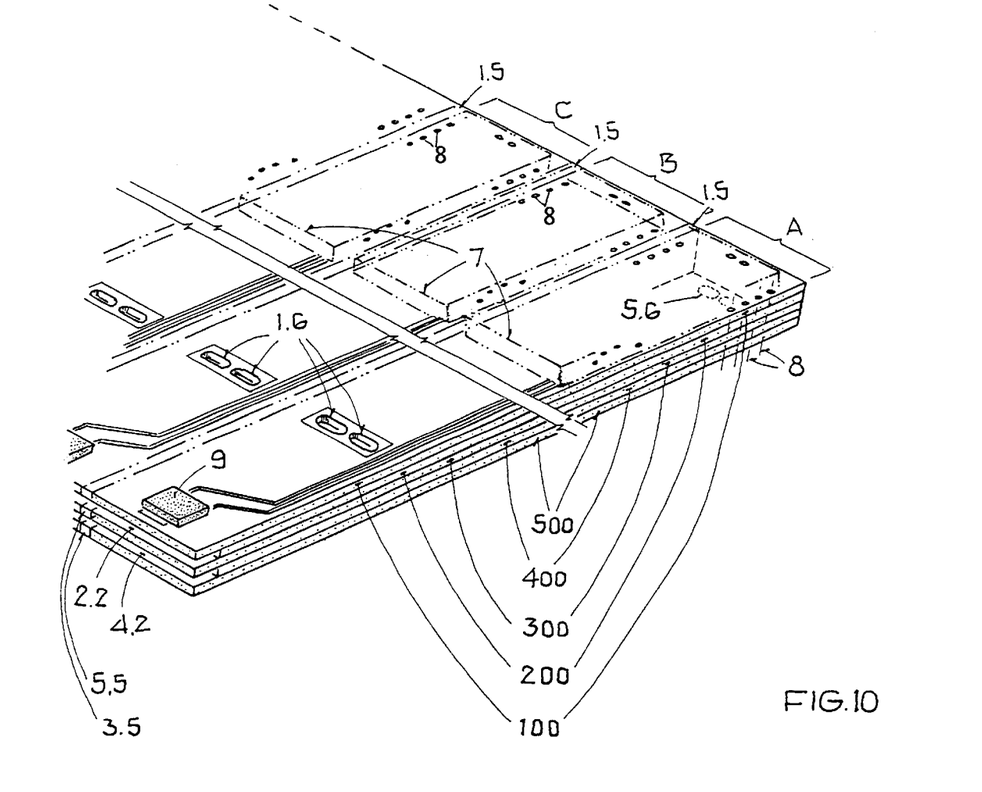
FIG. 10 illustrates in a perspective view the production of a multitude of individual sensor segments out of a multilayer printed circuit sandwich panel, comprising five layers, namely two outer carrier boards, one central carrier board, and two spacer plates whereby the sandwich panel is divided into identical sensor segments which are initially interconnected by strips or lands which are subsequently cut to separate the individual sensor segments out of the panel.

FIGS. 5 and 10 illustrate the parallel or simultaneous production of a multitude of sensors positioned next to each other in a multilayer printed circuit panel produced in accordance with multilayer printed circuit panel techniques. After completion of the panel it is cut into pieces to obtain the individual sensors. Each of the carrier boards or sheets 100, 300, and 500 is made of a suitable printed circuit carrier material and is provided with a plurality of identical sensor segments or portions spaced from one another by connector lands or strips. For example, the board 100 comprises a plurality of first carrier board sections 1, 1A, 1B, 1C, . . . arranged alongside one another and connected to each other by strips or lands 1.5 in the board or sheet 100. The spacer plate or sheet 200 comprises a respective plurality of spacer plate sections or segments 2, 2A, . . . whereby these sections or segments 2, 2A, . . . are initially also interconnected in the plate 200 by strips or lands 2.5. The board 300 comprises a corresponding plurality of intermediate carrier board sections 3, 3A, 3B, . . . interconnected by strips or lands 3.5. The plate or sheet 400 comprises a corresponding plurality of spacer plate segments 4, 4A, 4B, . . . connected by lands or strips 4.5 best seen in FIG. 4D. The board or sheet 500 comprises a corresponding plurality of carrier boards 5, 5A, 5B connected by lands or strips 5.5. The boards or sheets 100, 300 and 500 and the plates or sheets 200, 400 are stacked in proper alignment or register with each other and bonded to one another by a suitable adhesive known in the manufacture of multilayer printed circuit panels. When the bonding is completed the above-mentioned strips or lands 1.5, 2.5, 3.5, 4.5 and 5.5 are severed to separate the individual sensor segments out of the larger multilayer panel and the temporary insert strips 13 are removed from the sensors.

FIG. 10 further illustrates the simultaneous production of many sensors whereby the segments A, B, C, . . . of the carrier boards or sheets 100, 300, and 500 and the segments A, B, C, . . . of the spacer plates 200 and 400 which are bonded to one another in the multilayer panel, are cut out of the multilayer panel. The interconnecting strips or lands 1.5, 2.5, 3.5, 4.5, and 5.5 are still schematically indicated in FIG. 10 prior to severing. FIG. 10 further shows the lead-through contacts 8 and the first ports 2.2 and 4.2 of the hollow spaces 2.1 and 4.1. A medium pressure equalization inside the sensor and outside the sensor is achieved in the embodiment of FIG. 10 by ports 1.6 and 5.6 positioned in the outer carrier boards 1 and 5 rather than in the lateral margin areas. In FIG. 10, both hollow spaces 2.1 and 4.1 communicate with the medium in the container through outlet ports 1.6 in the board 100 and 5.6 in the board 500 to provide pressure equalization. In FIG. 5 pressure equalization is achieved through lateral ports 2.3, 4.3. However, these differently positioned ports 1.6 and 5.6 or 2.3 and 4.3 can be combined in the same sensor. For example, the hollow space 4.1 could have lateral ports 4.3 in the margin ares and the hollow space 2.1 could have pressure equalization ports 1.6 in the carrier board 1. The position of the port 1.6 is shown in more detail in FIGS. 8A and 9. The position of the port 5.6 is shown in more detail in FIGS. 8E and 9.

Figures 6, 6A, 7:
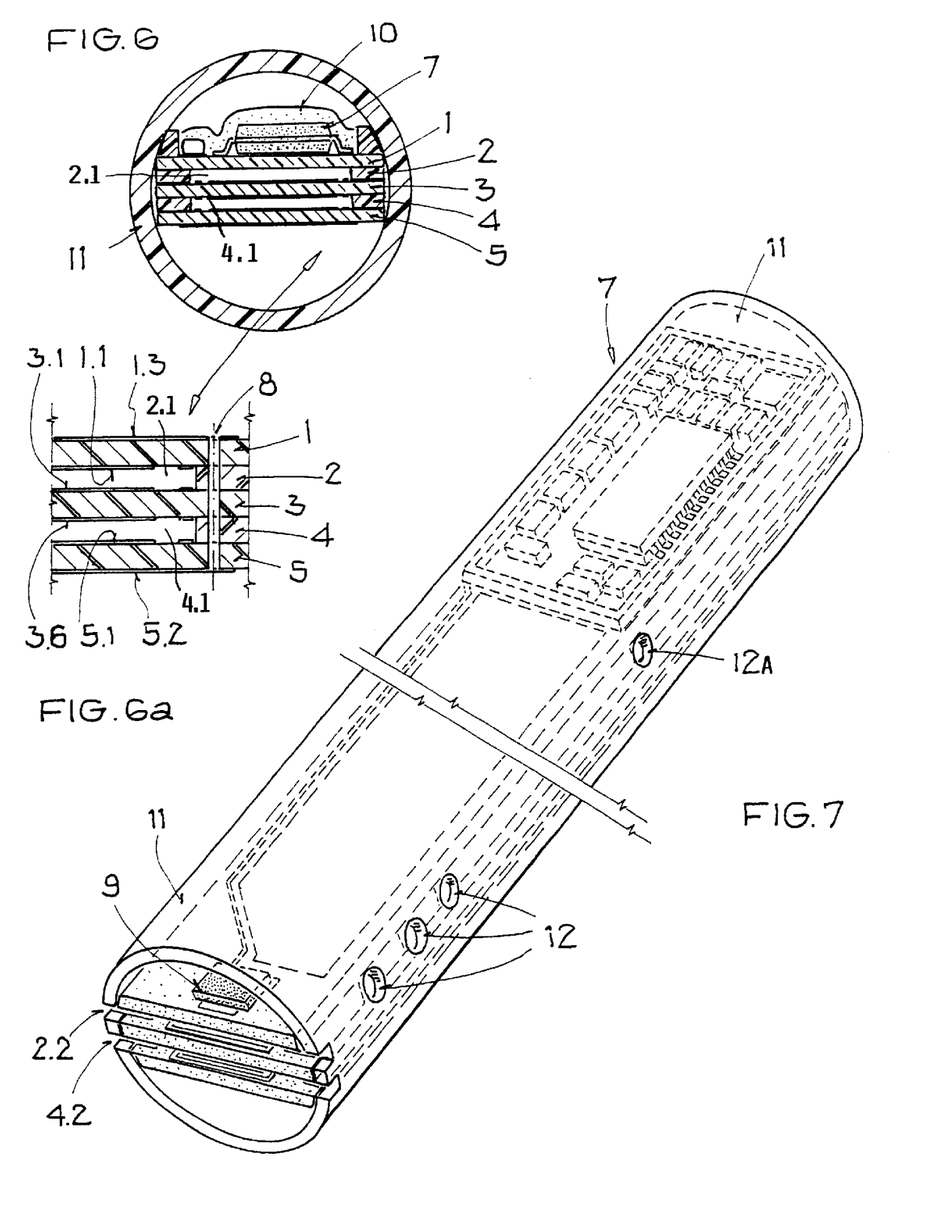
FIG. 6 is a sectional view perpendicularly to the longitudinal axis of a sensor arrangement according to the invention mounted in a tubular electrical screening housing.
FIG. 6A is also a sectional view as in FIG. 6, however showing on an enlarged scale a lead-through contact 8 passing through three carrier boards 1, 3, 5 and two spacer plates 2 and 4.
FIG. 7 is a perspective view of the sensor arrangement of FIG. 6 illustrating the protective and electrical screening housing provided with medium flow ports.

FIGS. 6 and 6A show a section through the present sensor arrangement comprising three carrier boards 1, 3 and 5 bonded to intermediate spacer plates 2 and 4. On the outwardly facing surfaces of the outer carrier boards 1 and 5 metal coatings 1.3 and 5.2 are provided to form an effective electrical screen against adverse field influences on the sensor. FIG. 6A shows on a larger scale than FIG. 6 the various metal coatings. Coatings 1.1 and 3.1 form capacitor plates facing each other across the hollow space 2.1. Coatings 3.6 and 5.1 form capacitor plates facing each other across the hollow space 4.1. Thus, two capacitors are provided. Metal coatings 1.3 and 5.2 form electrical protective screens as mentioned.

As shown in FIGS. 4 and 5, further protective screening is provided around the margins of the boards 1, 3 and 5 by metallic rims or margins 1.4, 3.3 and 5.3. These metallic rims are grounded, for example by a metallized lead-through contact 8 best seen in FIG. 6A. The metallized lead-through is a bore 8 passing through all boards 1, 3 and 5, through the spacer plates 2 and 4 and through the screens 1.3 and 5.2. The metal margins 1.4, 3.3 and 5.3 and the metal screens 1.3 and 5.2 are grounded through the lead-through contact 8 which is connected to respective conductor leads formed as contact zones. These lead-through contacts are formed as follows. First, contact zones are formed in the margin areas on the respective surfaces of the carrier boards 1, 3 and 5 by printed circuit techniques. Then the boards 1, 3 and 5 and the spacer plates 2 and 4 are stacked, properly aligned and bonded to one another. Then holes are drilled through the contact zones and the holes are metallized to form the lead-through contact 8, whereby this lead-through contact is electrically connected to the respective contact zones that are to be grounded. More specifically, these lead-through contacts 8 are normally formed only after the carrier boards 1, 3 and 5 and the spacer plates 2 and 4 have been bonded to each other, however the lead-through contacts are formed prior to cutting a large multilayer printed circuit panel into segments, each of which forms a sensor.

FIGS. 6 and 6A further show that the assembled sensor with its two capacitors formed by capacitor plates 1.1, 3.1 and 3.6, 5.1, is mounted inside a metal tube 11 forming a further electrical screening. The tube 11 is provided with medium flow ports 12 and 12A and is preferably open-ended as best seen in FIG. 7. The ports 12, 12A provide for the required pressure equalization inside the sensor and outside the sensor. The above-mentioned evaluating circuit 7 is embedded in a potting material 10 for protecting the evaluating circuit against adverse influences as best seen in FIG. 6. By using copper coated or clad printed circuit boards as carrier boards 1, 3 and 5, printed circuit etching techniques may be employed to form the capacitor coatings or plates 1.1, 3.1, 3.6, and 5.1, the protective screen forming metal coatings 1.2, 1.3, 3.2 and 5.2 and the conductor leads 1.4, 3.3 and 5.3 for the protective screens and further electrical conductor leads 1.7, 3.4 and 5.4. Insulation coatings and metallizing techniques used in the printed circuit production are also suitable for the present purposes particularly in forming the lead-through contacts 8.

Figures 8A, 8B:
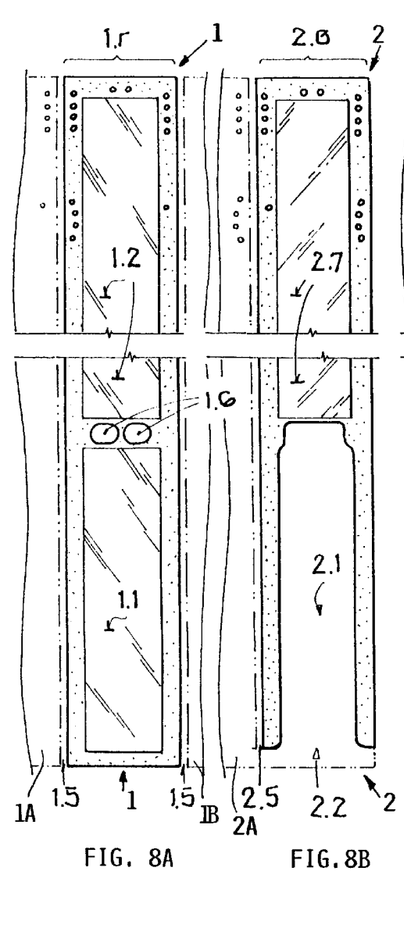
FIGS. 8A to 8E illustrate in an exploded view a second embodiment of the present sensors with medium flow openings in the outer carrier boards for a medium inflow and outflow.
Figure 8C:
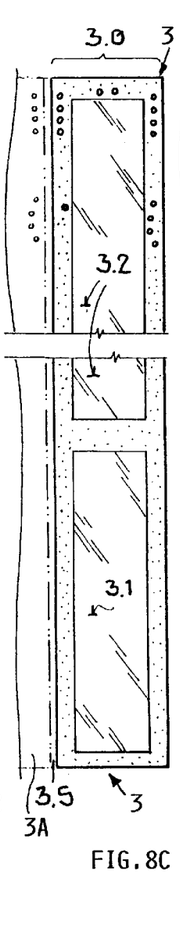
Figure 8D:
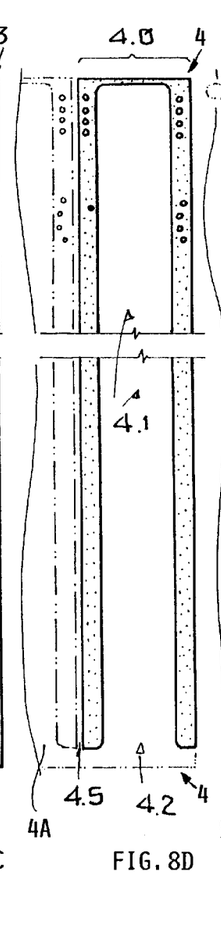
Figure 8E:
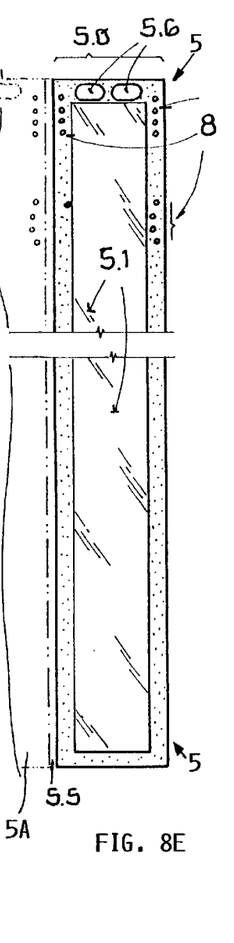
Figure 9:
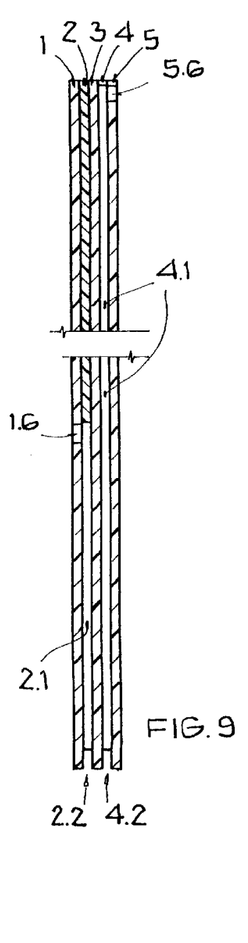
FIG. 9 shows the sensor of FIG. 8 in its assembled form and in a longitudinal section thereof.

FIGS. 8A to 8E show a second embodiment of a sensor according to the invention in which the pressure equalization ports 1.6 shown in FIG. 8A and 5.6 shown in FIG. 8E pass directly through the outer carrier boards 1 and 5 respectively rather than through the lateral margin sections or areas of the spacer plates as shown in the above described first embodiment. The first or bottom ports 2.2 and 4.2 are provided at the ends of the spacer plates 2 and 4 by making the spacer plates shorter than the carrier boards as in the first embodiment. FIG. 9 shows the hollow space 2.1 communicating with the port 2.2 and with the ports 1.6 while the port 5.6 communicates with the hollow space 4.1 as does the port 4.2. When the hollow space 2.1 in the spacer plate 2 is completely filled the medium can flow out through the ports 1.6. When the hollow space 4.1 is filled completely, the medium can flow out of the ports 5.6. The pressure equalization between the medium 6 inside and outside of the hollow spaces 2.1 and 4.1 is achieved in both instances.

The arrangement of the ports 1.6 and 5.6 in the carrier boards 1 and 5 has the advantage that the marginal sections 2.4 and 4.4 of the spacer plates 2 and 4 do not have to be interrupted by ports so that the hollow spaces 2.1 and 4.1 are completely surrounded by the spacer plate except for the bottom ports 2.2 and 4.2, thereby increasing the dimensional stability.

FIG. 8 further illustrates the strips or lands 1.5, 2.5, 3.5, 4.5, and 5.5 which, prior to cutting individual sensors out of a panel, hold the respective board segments or spacer plate segments together. A multitude of carrier board sections 1, 1A, ... are formed on a printed circuit board or sheet as described above. This applies equally to sheets for carrier board segments 3, 3A, ... and 5, 5A, ... Similarly, spacer plates 2, 2A, ... 4, 4A, ... are formed on respective spacer sheets of suitable dimensionally stable material. These sheets are then stacked or sandwiched, aligned and bonded to each other to form the multilayer panel shown in FIG. 9. Finished panels are then severed along the connector strips or lands 1.5, 2.5, 3.5, 4.5 and 5.5 to form individual sensors as mentioned above. The bores for lead-through contacts 8 are drilled or punched after the bonding of the several boards and plates to one another. However, the ports 1.6 and 5.6 are punched or machined prior to stacking and bonding to form the panel. Similarly, the hollow spaces in the spacer sheets may be formed by punching. FIG. 10 illustrates the just described operation just prior to the severing the individual sensor segments out of the panel.

Another important advantage of the invention is seen in that the size of the spacer margin sections 2.4 and 4.4, especially their dimension in a direction parallel to the capacitor plates and perpendicular to the length of the sensor, is freely selectable in accordance with the dimensional stability requirements of the particular sensor. The diameters of conventional spacer rivets or spacer rings around the rivets cannot be freely selected because larger rivet holes in the boards and plates weaken these boards and plates.

Another advantage of the present sensors is seen in that very low filling levels can be measured because the first bottom ports 2.2 and 4.2 can be located directly next to the floor of the container for medium, however low in the container, to enter into the space between the neighboring capacitor plates which can practically reach to the floor of the container except for a narrow electrical insulation rim of the respective carrier board 1, 3, 5.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A capacitive sensor for measuring a characteristic of a liquid or gas, said capacitive sensor comprising at least two carrier boards carrying printed circuit elements, at least one spacer plate between said at least two carrier boards for spacing said carrier boards from each other, a hollow space in said at least one spacer plate, said printed circuit elements comprising metal coatings on inner board surfaces facing said hollow space, said metal coatings forming capacitor plates, at least one first port positioned in said sensor for said liquid or gas to enter into said hollow space inside said sensor, at least one second port positioned in said sensor spaced from said first port for permitting said liquid or gas to exit from said hollow space for pressure equalization in said hollow space relative to pressure outside said hollow space whereby, in operation, said liquid or gas forms a dielectric between said capacitor plates, and wherein said printed circuit elements further comprise conductor leads connected to said capacitor plates for retrieving sensed signals from said capacitor plates.

2. The capacitive sensor of claim 1, wherein said at least one spacer plate forms a spacer margin area around said hollow space and wherein at least one of said first and second ports passes through said spacer margin area.

3. The capacitive sensor of claim 2, wherein said spacer margin area has a first length around said hollow space, wherein said ports have a second length around said hollow space, and wherein said first length is larger than said second length.

4. The capacitive sensor of claim 1, further comprising electrical lead-through contacts (8) passing through said at least one spacer plate and through said carrier boards, at least certain of said conductor leads being electrically connected to said lead-through contacts.

5. The capacitive sensor of claim 4, further comprising a signal evaluating circuit (7) carried on an outwardly facing surface of one of said carrier boards, and wherein certain of said conductor leads connect said capacitor plates to said evaluating circuit through respective electrical lead-through contacts.

6. The capacitive sensor of claim 4, comprising at least three carrier boards (1, 3, 5) including two outer carrier boards (1, 5) and an intermediate carrier board (3), said sensor further comprising at least two spacer plates (2, 4) each of which is positioned between said intermediate carrier board (3) and one of said outer carrier boards, said intermediate carrier board comprising a further metal coating on each of its opposite surfaces for forming further capacitor plates cooperating with said first mentioned capacitor plates, and wherein said further capacitor plates are connectable to a common electrical potential, preferably to a common reference potential through respective lead-through contacts of said lead-through contacts and respective ones of said conductor leads.

7. The capacitive sensor of claim 4, further comprising metal screens positioned for electrically screening said capacitive sensor, and wherein said metal screens are adapted for connection to a reference potential through respective ones of said conductor leads and respective lead-through contacts.

8. The capacitive sensor of claim 7, wherein said metal screens comprise metal strips spaced and insulated from said capacitor plates and surrounding said capacitor plates for electrically protecting a respective capacitor against adverse field influences.

9. The capacitor sensor of claim 1, wherein at least one of said ports comprises at least one hole (1.6; 5.6) in at least one of said two carrier boards forming outside carrier boards.

10. The capacitive sensor of claim 1, further comprising a metal housing wherein said carrier boards and said spacer plates are contained, said metal housing forming an electrical screen for protecting said sensor against adverse field influences.

11. The capacitor sensor of claim 10, wherein said metal housing comprises openings (12, 12A) forming ports for said medium.

12. The capacitor sensor of claim 10, wherein said metal housing has at least one open end to form a port for said medium.

13. A method for manufacturing a capacitive sensor having at least one spacer plate between two carrier boards and a hollow space formed by said spacer plate between said carrier boards carrying printed circuit elements including metal coatings forming capacitor plates facing each other across said hollow space to form a sensor capacitor for measuring a characteristic of a liquid or gas in said hollow space, said method comprising the following steps:

(a) preparing said carrier boards by printed circuit techniques for forming said printed circuit elements including conductor leads, electrical screens and said metal coatings forming said capacitor plates, (b) providing said spacer plate with said hollow space;

(c) stacking said carrier boards and spacer plate to form a stack wherein said spacer plate is positioned between said carrier plates and wherein said capacitor plates are facing each other across said hollow space, (d) providing ports for flowing said liquid or gas into said hollow space and for pressure equalization, (e) providing said stack with first metallized lead-through contacts connecting said capacitor plates with respective ones of said conductor leads, and (f) providing said stack with second lead-through contacts connecting said electrical screens to respective other ones of said conductor leads.

14. The method of claim 13, further comprising adhesively bonding said carrier boards and spacer plate to one another in said stack.

15. The method of claim 13, further comprising the following steps:

(a) forming a plurality of carrier board segments on first sheets by printed circuit techniques to provide said printed circuit elements, wherein said carrier board segments are interconnected in said first sheets by lands or strips, (b) forming a plurality of hollow spaces through a second sheet thereby providing a plurality of spacer plate segments on said second sheet, wherein said spacer plate segments are interconnected in said second sheet by lands or strips, (c) providing ports for flowing said liquid or gas into said hollow spaces and for pressure equalization, (d) stacking and connecting said first and second sheets so that one second sheet is positioned between two first sheets and so that said lands or strips register with each other in a stack of a plurality of sheets forming a multilayer panel, (e) providing said lead-through contacts through said sheets in said multilayer panel, and (f) severing said multilayer panel along said lands or strips to form a multitude of said capacitive sensors.

16. The method of claim 15, further comprising the step of temporarily filling said plurality of hollow spaces with a filler material (13) for preventing deformations of said carrier boards and spacer panels during said connecting step, performing said connecting step, and then removing said filler material.

17. The method of claim 16, wherein said filler material is a strip (13) of PTFE (polytetrafluoroethylene) which is removed after said connecting step and said severing step have been performed.

18. The method of claim 15, wherein said connecting step is performed as an adhesive bonding step.

* * * * *